July 26, 1927.
T. L. BURTON
ANGLE COCK HOLDER
Filed July 18, 1923
1,636,805
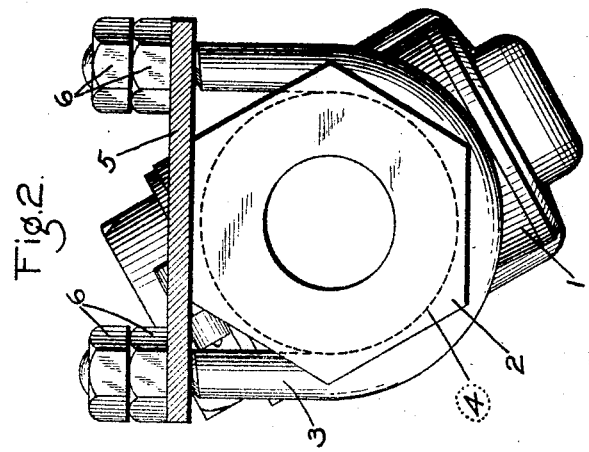
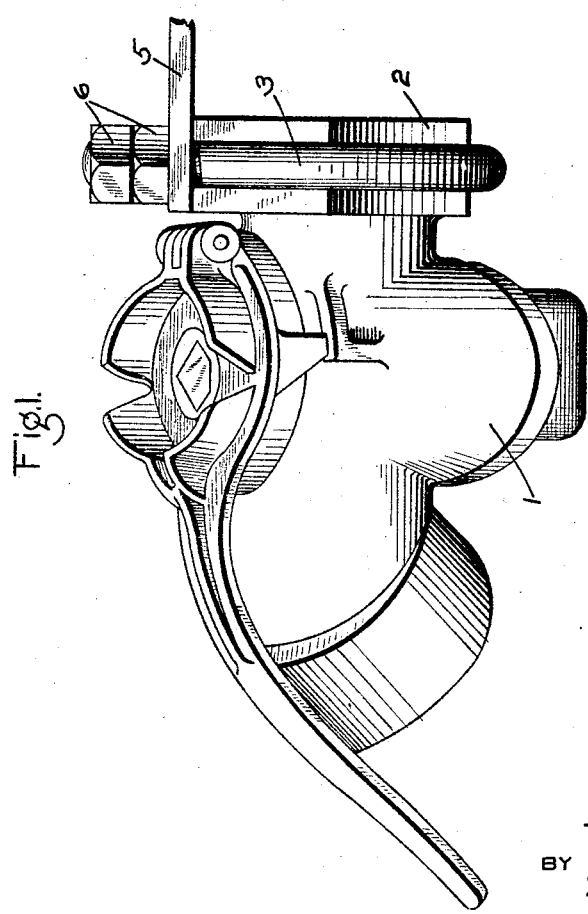
INVENTOR
THOMAS L. BURTON
BY *Wm. M. Cady*
ATTORNEY Patented July 26, 1927.

1,636,805

UNITED STATES PATENT OFFICE.

THOMAS L. BURTON, OF NEW YORK, N. Y., ASSIGNOR TO THE WESTINGHOUSE AIR BRAKE COMPANY, OF WILMERDING, PENNSYLVANIA, A CORPORATION OF PENNSYLVANIA.

ANGLE-COCK HOLDER.

Application filed July 18, 1923. Serial No. 652,355.

This invention relates to angle cock holders and the principal object of my invention is to provide an improved angle cock holder of simple construction, which will prevent rotative as well as longitudinal movement of the angle cock, and which will positively maintain the angle cock in the desired inclined position with respect to the car.

In the accompanying drawing; Fig. 1 is a side elevation of the angle cock, showing my improved holder applied thereto; and Fig. 2 a rear end view of the construction shown in Fig. 1.

In the drawing, the reference numeral 1 indicates an angle cock of the usual construction as employed on railway cars for controlling communication through a train pipe and provided with usual hexagonal wrench-hold portion 2.

According to my invention, in order to support the angle cock and the train pipe, a U bolt 3 is employed. The hexagonal wrench-hold portion 2 of the angle cock 1 is provided with an annular groove 4, which may be machined in old existing angle cocks or may be cored in new angle cocks. The U bolts 3 is applied to the angle cock so as to engage in the groove 4, as clearly shown in the drawing, and the ends of the U bolt 3 are passed through holes in a supporting plate 5, which is secured to the car in any suitable manner. Nuts 6 are then applied to the threaded ends of the U bolt 3, and by screwing up the nuts, the angle cock 1 is securely clamped in position. A face of the hexagonal portion 2 engages the supporting plate 5, so that rotative movement of the angle cock is prevented and at the same time, the cock is maintained in the desired inclined position with respect to the car. Longitudinal movement of the angle cock with respect to the car is prevented by the engagement of the U bolt 3 in the groove 4.

The supporting plate 5 may be a separate part secured to the car or may be a part associated with the car, such as the draw-bar housing, coupler carrier iron, end sills, and the like.

The above described angle cock holder dispenses with the use of specially constructed holding devices, it being only necessary to provide a groove in the hexagonal portion of the angle cock and an ordinary U bolt for engaging in the groove.

Having now described my invention, what I claim as new and desire to secure by Letters Patent, is:—

1. The combination with an angle cock having a hexagonal wrench-hold portion provided with an annular groove, of a supporting member and a U bolt engaging in said groove for clamping said angle cock to said supporting member.

2. In a device of the class described, the combination with an angle cock having a hexagonal head adjacent to the angle cock body, said head having a peripheral groove therein forming a pair of flat bearing faces, a supporting plate, and a U-bolt in said groove and engaging with the plate to hold said bearing faces against the plate.

In testimony whereof I have hereunto set my hand.

THOMAS L. BURTON.